May 19, 1953   E. A. ROCKWELL   2,638,747
PRESSURE FLUID OPERATED PRESSURE INTENSIFIER
Filed June 9, 1944   6 Sheets-Sheet 1
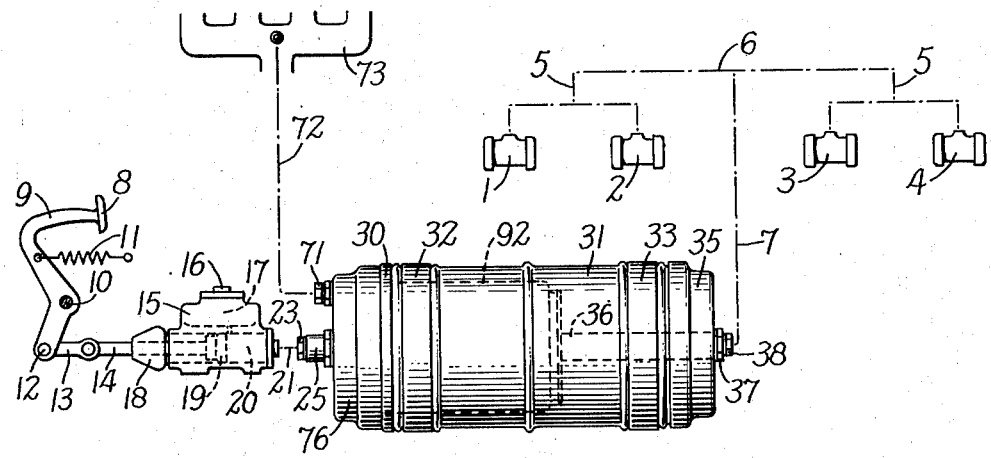
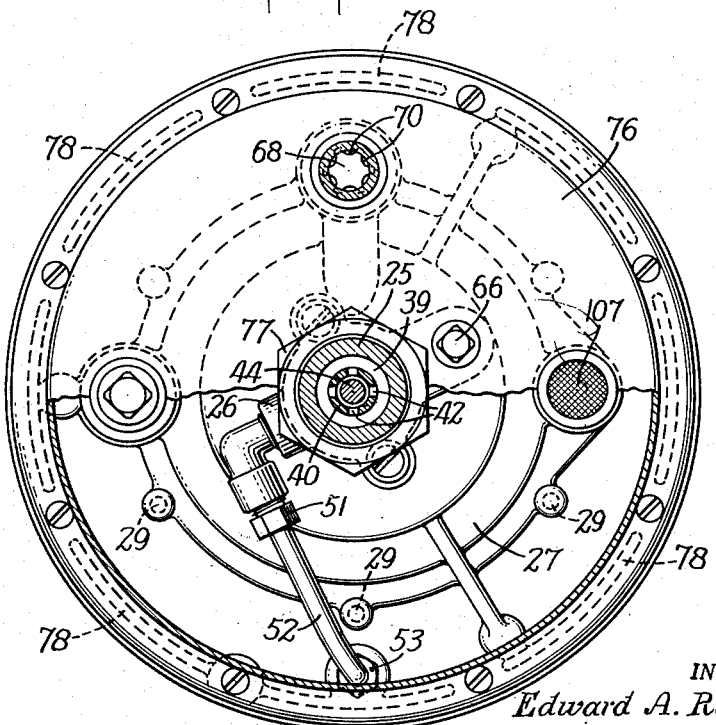
INVENTOR.
Edward A. Rockwell
BY
ATTORNEY May 19, 1953    E. A. ROCKWELL    2,638,747
PRESSURE FLUID OPERATED PRESSURE INTENSIFIER
Filed June 9, 1944    6 Sheets-Sheet 3

INVENTOR.
Edward A. Rockwell
BY Arthur Wright
ATTORNEY

May 19, 1953 E. A. ROCKWELL 2,638,747
PRESSURE FLUID OPERATED PRESSURE INTENSIFIER
Filed June 9, 1944 6 Sheets-Sheet 5

INVENTOR.
Edward A. Rockwell
BY
Arthur Wright
ATTORNEY

May 19, 1953  E. A. ROCKWELL  2,638,747
PRESSURE FLUID OPERATED PRESSURE INTENSIFIER
Filed June 9, 1944  6 Sheets-Sheet 6
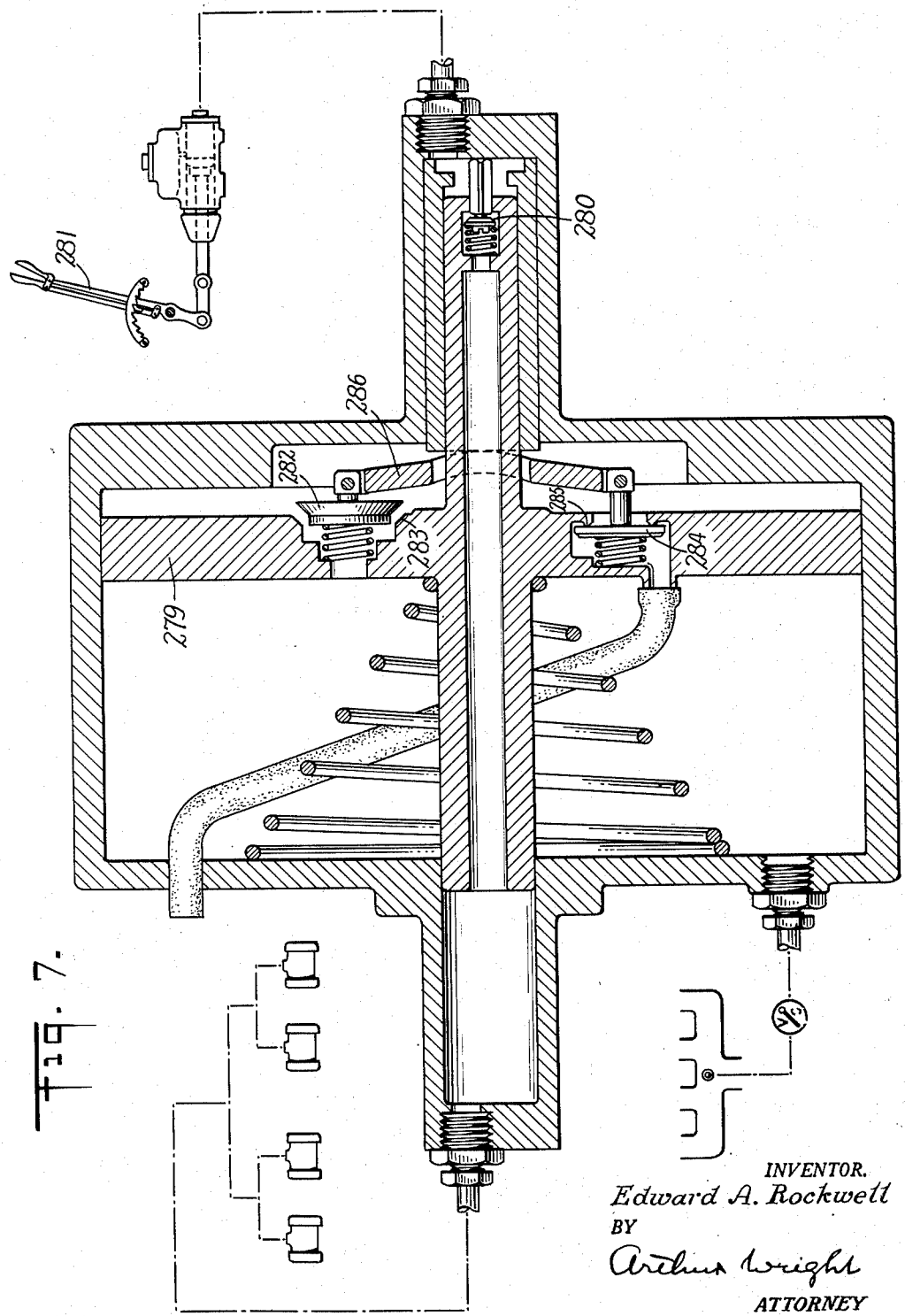
INVENTOR.
Edward A. Rockwell
BY
Arthur Wright
ATTORNEY

Patented May 19, 1953

2,638,747

UNITED STATES PATENT OFFICE 2,638,747

PRESSURE FLUID OPERATED PRESSURE INTENSIFIER

Edward A. Rockwell, Cleveland, Ohio

Application June 9, 1944, Serial No. 539,584

9 Claims. (Cl. 60—54.5)

My invention relates particularly to power units in compact form, that may be used to perform work, as for example in the operation of parts of automotive vehicles, such as brakes, etc.

The object of my invention is to provide a power unit which is capable of being used advantageously for the operation of any desired part to be moved and which is especially applicable to the operation of brakes in automotive vehicles, such for instance as automobiles, airplanes, etc. The object of my invention is also to provide a power unit in compact form for the operation of any desired part to be moved, as for example on automotive vehicles. Another object is to provide a unit of this character in such a manner as to obtain an effective ratio of input force to output force. A further object is to provide an effective means for obtaining liquid compensation in the parts which operate the power valves. Still a further object is to locate all of the controlling connections for the power unit at one end thereof. A further object is to locate all of the valves of the unit at the same end thereof. Again, a further object is to avoid the location of any valves in the power plunger. Still another object is to locate the valves in such a way as to obtain a reaction from either the valve mechanism or the delivered high pressure liquid or both of them or from neither of them. Further objects of my invention will appear from the detailed description of the same hereinafter.

While my invention is capable of being carried out in many different ways I have shown only certain forms of my invention in the accompanying drawings in which Fig. 1 is a diagrammatic representation of an automotive vehicle equipped with my invention;

Fig. 3 is a transverse vertical section of the power unit shown in Fig. 1, taken on line 3—3 of Fig. 2;

Fig. 7 is a similar view of a power unit which is non-reactive.

Figure 2:
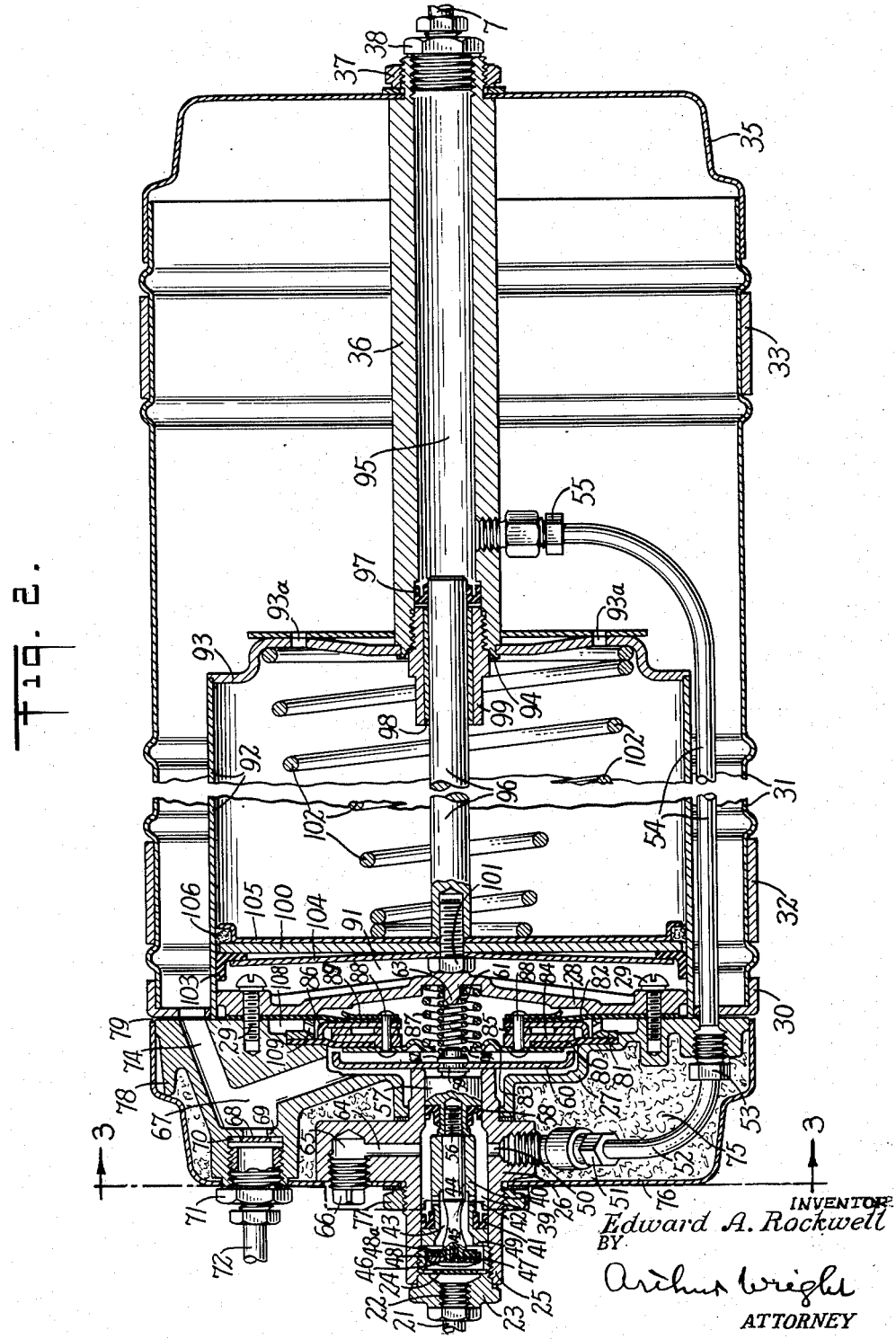
Fig. 2 is a longitudinal section of a power unit made in accordance with my invention.

In the drawings, referring first to Figs. 1 to 3, I have shown an automotive vehicle having front wheel brake cylinders 1 and 2 and rear wheel brake cylinders 3 and 4 provided with hydraulic branch pipes 5 which are connected together by a hydraulic pipe system 6 having a pipe 7 to receive the hydraulic fluid of any desired character for operating the brake cylinders. On the automobile, there is the usual pedal 8 located on a pedal lever 9 carried by a pivot 10 on the automobile chassis, the same being provided with a retracting spring 11 connected to the chassis. Below the pivot 10 there is a pivotal connection 12 carrying a link 13 which is pivotally connected to the usual master cylinder piston rod 14 passing into a master cylinder 15 having at the upper portion thereof a vested filling cap 16 leading to a reservoir 17 forming a part of the master cylinder 15. Said master cylinder has the usual boot 18 around the piston rod 14, carrying a piston 19 in a cylinder 20 for delivering the hydraulic liquid from the master cylinder by a pipe 21 to an inlet opening 22 in a screw fitting 23, in the power unit. The screw fitting 23 is provided with an apertured baffle 24 and is screw-threaded into a tubular portion 25 of an end casting 26 which is secured in any desired way to a valve casing 27. The valve casing 27 is secured to an apertured spider 28 by screws 29. Adjacent to the valve casing 27 there is a ring 30 to which there is secured an outer shell 31 having clamping bands 32 and 33 to secure the outer shell 31, in any desired way, at any place on the chassis of the automobile. The other end of the shell 31 has secured thereto a cap 35 located over the end of a hydraulic cylinder 36, where it is secured in place by a nut 37. Within the end of the cylinder 36 there is screw-threaded a fitting 38 which is connected to the pipe 7.

The manually supplied liquid, received in the inlet opening 22 in the fitting 23, passes into a cylinder 39 in which there is located a plunger 40 having a U-shaped rubber seal 41. The said plunger 40, furthermore, has a series of radial holes 42 leading to a chamber 43 in the plunger 40 formed by a valve plunger 44 having a reduced end 45, to which there is attached a valve member 46 by a screw 47 to the end of the valve plunger. The valve member 46 has at its periphery a valve flange 48 and rubber washer 48a which is adapted to seat on a valve seat 49 carried by the end of the plunger 40. In the inner end of the chamber 39 there is a port 50 which leads to a fitting 51 and a pipe 52 which has another fitting 53 screw-threaded in the valve casing 27 and at this point the valve casing 27 is secured, in any suitable way, to a pipe 54 which extends inside of the shell 31 to a screw fitting 55 in the side of the cylinder 36 so as to deliver initially the liquid under manual pressure to the brake cylinders 5. Furthermore, the right hand end of the valve plunger 44 has a screw-thread 56 for securing thereto a valve operating plunger 57 carrying a U-shaped rubber seal 58. This valve operating plunger 57, furthermore, has a reduced extension 59 on which there is securely fastened a vacuum controlling admission valve 60 which is normally moved into open position by a small helical spring 61 which seats on a shoulder 62 on the plunger 57 at one end and which, at the other end thereof, is located around a boss 63 on the spider 28. It should also be noted that the casting 26 has a lateral port 64 communicating with an opening 65 which is normally closed by a screw plug 66 but which may, if desired, communicate with the brake system of a trailer. The vacuum which is controlled by the valve 60, is communicated thereto by a passageway 67 in the valve casing 27 and which has therein a check valve 68 cooperating with a valve seat 69. The said check valve 68 has a series of peripheral notches 70 for the passage of the pressure fluid. The vacuum is supplied to the passageway 67 from a screw fitting 71 which communicates by a pipe 72 with a manifold 73 on the engine of the automobile. Furthermore, the said vacuum passageway 67 communicates with a passageway 74 for supplying vacuum to the inside of the shell 31. Between the casting 26 and the valve casing 27 there is an air chamber 75 which may be filled with horsehair, and the said chamber is enclosed by a cover plate 76 which is secured on the outside of the casting 26 by a nut 77 and which rests near its periphery upon a series of fingers 78 formed on the periphery of the valve casing 27. A peripheral gap 79 remains open around the edge of the cover plate 76 for the entry of air. The vacuum valve 60, when closed, is arranged to seat on a diaphragm 80 which is clamped against the valve casing 27 by a clamping ring 81 which rests against the face of a second diaphragm 82 secured between the valve casing 27 and the spider 28. Mounted on the two diaphragms 80 and 82 there are a clamping ring 83 and a spacing ring 84 having peripheral radial apertures 85, the same being secured together with an air inlet valve 86 and the two diaphragms 80 and 82 as well as a retaining ring 87, by means of rivets 88. A large helical spring 89, supported on the spider 28 at one end and on the ring 83 at the other end, normally moves the air inlet valve 86 outwardly, whereas at other times its periphery rests against the diaphragm 80. Also, there is a central opening 90 in the ring 83 to conduct the vacuum, when the valve 60 is open, through the spider 28 to a chamber 91 within a power cylinder 92, which is supported at one end thereof by the ring 30. The other end of the cylinder 92 is welded, or otherwise fastened, to a cylinder head 93, having apertures 93a, which is carried in a peripheral recess 94 on the cylinder 36. The said cylinder 36 has a power intensifying chamber 95 in which there is arranged to reciprocate a plunger 96 carrying a U-shaped rubber seal 97, and the plunger 96 is guided within the cylinder 95 by a bushing 98 carried within and secured to a sleeve 99 screw-threaded to the interior of the cylinder 36. The said plunger 96, at the other end thereof, is fastened to a piston head 100 by means of a screw 101, and the said piston head 100 is normally moved to the left by means of a helical spring 102 which at the other end rests against the cylinder head 93. The piston head 100 is arranged to fit tightly in the cylinder 92 by means of a leather washer 103 which is retained around the periphery thereof by means of a spring plate or disk 104 carried on the screw 101. Also carried on the screw 101 there is a dished retainer plate 105 which supports around its periphery a felt ring 106. As shown in Fig. 2, the air which enters the chamber 75 passes therefrom through a screen 107, Fig. 3, located near the periphery of the valve casing 27 so that the air therefrom can reach an annular chamber 108 which communicates by air passages 109 with the outer face of the air inlet valve 86, so that the said air, when admitted, beneath the periphery of the valve 86, can pass by the passages 85 through the spider 28 and thence to the chamber 91 so as to act upon the face of the piston head 100.

Figure 4:
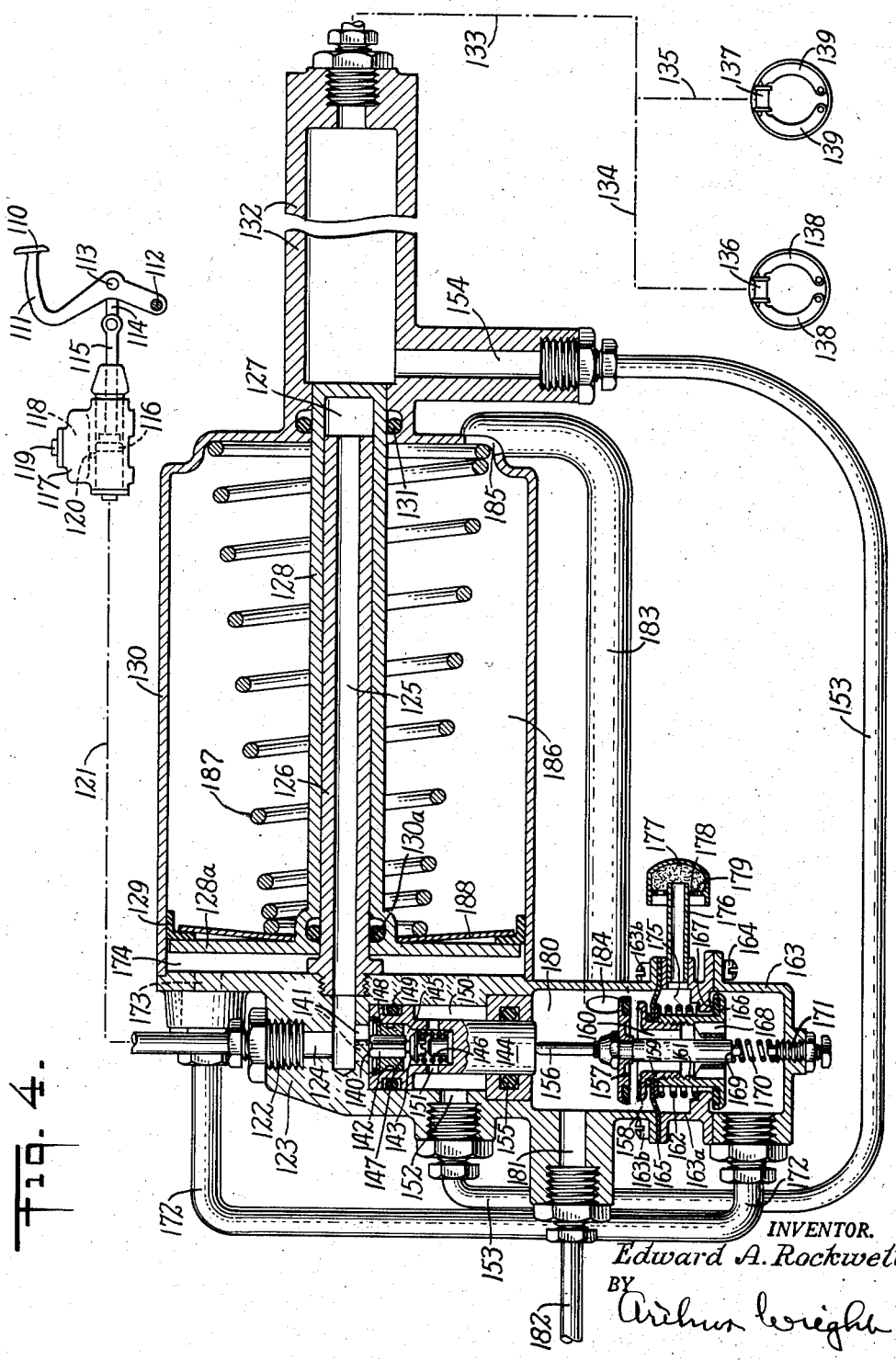
Fig. 4 is a longitudinal section of a modified form of said power unit, shown diagrammatically.

In the modification of my invention in Fig. 4, there is shown diagrammatically a modified form of the power unit for operating the wheel brakes of an automotive vehicle. As shown therein, I have provided a pedal 110 carried by a pedal lever 111 mounted on a pivot 112 carried by the chassis of an automobile. The lever 111 has a pivot 113 for a link 114 which is connected to a piston rod 115 having a piston 116 operating in a master cylinder 117. The master cylinder has the usual reservoir 118 provided with a vented filling cap 119 and a liquid compensation port 120 to supply liquid to a cylinder 117 in the retracted position of the piston 116. The cylinder 117 is connected by a pipe 121 to an inlet opening 122 in a valve casing 123 which is provided with a chamber 124 which connects with a passageway 125 in a monitor piston 126 screw-threaded into the side of the valve casing 123. The passageway 125 communicates with a chamber 127 in the end of a hollow plunger 128 having a piston 128a which is provided with a leather sealing ring 129 fitting within a power cylinder 130. The plunger 128 has an internal annular seal 130a. The plunger 128, also, has a rubber seal 131 carried by the cylinder 132. Beyond the right-hand end of the plunger 128 there is a hydraulic pressure increasing cylinder 132 forming a part of the cylinder 130, the cylinder 132 being connected by a pipe 133 to branch pipes 134 and 135 leading to brake cylinders 136 and 137 respectively, which are connected, respectively, to brake shoes 138 and 139 on the rear wheels of the automobile. It will be understood, of course, that similar branch pipes and brake cylinders may be connected to the pipe 133 leading to front wheel brakes on the automobile, if desired.

Within the chamber 124 in the fitting 122 there is also provided a valve stop 140 adjacent to apertures 141. The said stop 140 cooperates with a web 142 which is attached to a valve 143 in the upper or retracted position of a plunger 144. The valve 143 is located in a recess 145, having a helical spring 146 to normally seat the valve 143 against a valve seat 147, in a plunger head 148 screw-threaded to the plunger 144. The plunger head 148, furthermore, has a rubber seal 149 operating within a chamber 150 in the valve casing 123. Communicating with the chamber 150 there are a plurality of radial ports 151 leading to the recess 145. Furthermore, the said chamber 150 has a lateral port 152 which communicates with a pipe 153 leading to a port 154 in the pressure increasing cylinder 132. At its lower end the plunger 144 passes through a seal 155 in the valve casing 123 and contacts with a valve stem 156 on which there is carried a vacuum valve 157 adapted to seat on a valve seat 158 carried by a screw ring 159 having a series of internal flutings 160 for guiding the valve stem 156. The valve ring 159, furthermore, is screw-threaded to an air inlet valve member 161 normally pressed upwardly by a helical spring 162 seated within a spacing ring 163a secured by screws 163b to the valve casing 123 and to a cap 163 by screws 164. Between the spacing ring 163a and the valve casing 123 there is clamped, at its outer periphery, a diaphragm 165, the inner periphery thereof being clamped between the screw ring 159 and the air inlet valve member 161. It will be noted, furthermore, that the air inlet valve member 161 has a flange valve 166 which cooperates with a valve seat 167 on the spacing ring 163a and that the said valve member 161 has a series of longitudinal passageways 168 to act to permit the passage of air. On the stem 156 there is a shoulder 169 supporting a helical spring 170, the lower end of which is supported by an adjusting screw 171 screw-threaded in the cap 163. The cap 163, furthermore, is connected by a pipe 172 to an inlet 173 leading to a chamber 174 in the power cylinder 130. Also, within the spacing ring 163a there is a chamber 175 having an air inlet pipe 176 covered by a cap 177 supported therefrom by a spider ring 178 having air inlet apertures 179. The valve casing 123 has a vacuum chamber 180 which communicates by a port 181 with a pipe 182 which is connected to the manifold of the automobile engine. Also, said valve casing has a vacuum pipe connection 183 leading from a port 184 in the valve casing 123 to a port 185 in a vacuum chamber 186, at the right of the piston 128a, in which there is located a helical spring 187 supported at one end by the cylinder 130 and at the other end against a ring 188 which is pressed by the spring 187 against the leather washer 129 to retain it in place.

Figure 5:
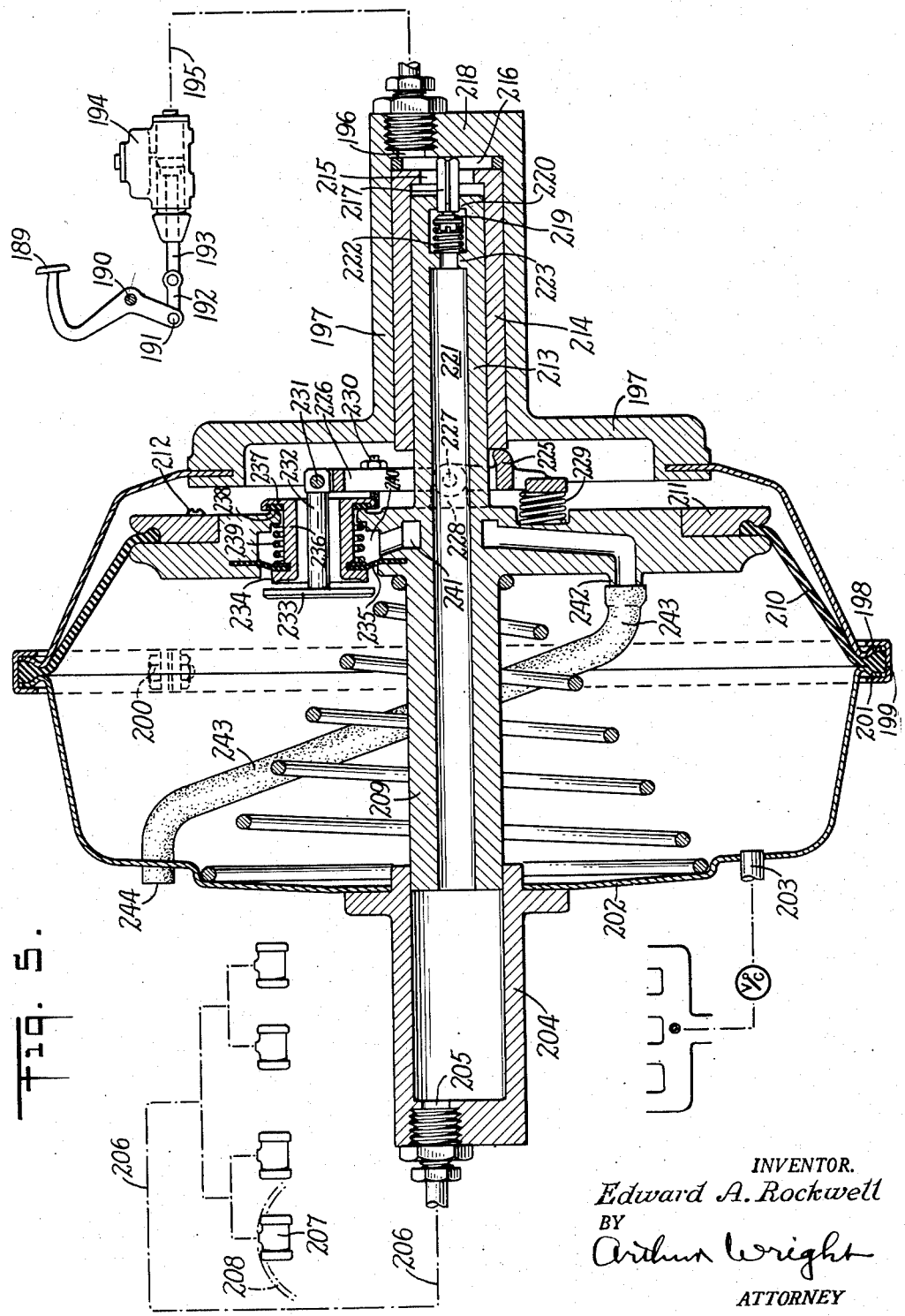
Fig. 5 is a diagrammatic longitudinal section of a power unit deriving its reaction only through the valve mechanism.
Figure 6:
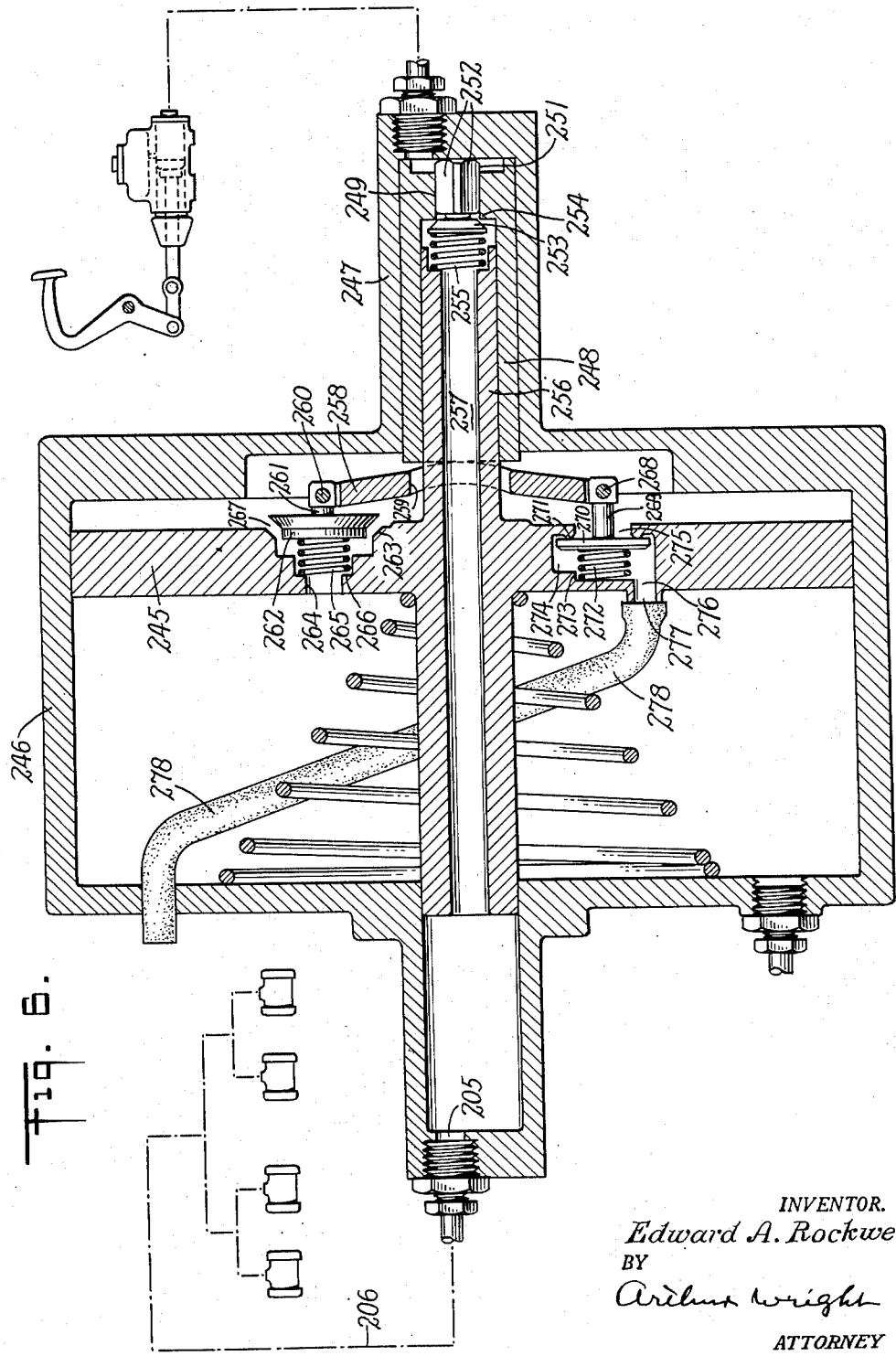
Fig. 6 is a similar view of a power unit deriving its reaction only from the delivered hydraulic liquid.

In Figs. 5, 6 and 7 I have shown, diagrammatically, other modifications of my invention, each of which, preferably, has a liquid compensator and hydraulic cut-off valve located at the inlet end of the apparatus. These modifications of my invention illustrate the manner in which the reaction on the manual means, during the operation of the apparatus, may be effectively controlled so as to obtain the reaction only from the modulator valves, as in Fig. 5, or to obtain a reaction only from the hydraulic pressure liquid applied in operating the brakes, as in Fig. 6, or so as to avoid any reaction from the valve mechanism and the hydraulic pressure liquid applied to the brakes, as in Fig. 7.

In the form of my invention as shown in Fig. 5, I have provided the usual pedal 189 mounted on a fixed pivot 190 having a pivotal connection 191 by a link 192 to a piston rod 193 in a master cylinder 194 which is connected by a hydraulic line 195 to an inlet 196 on a combined plunger and diaphragm housing 197. The housing 197 has a flange 198 enclosed by a U-shaped split ring 199, the ends of which have a bolt 200 pulling them together in a peripheral direction. Said ring 199, also, clamps a flange 201 of a diaphragm housing 202 which has a connection 203 to any desired source of vacuum. Integral with the diaphragm housing 202 there is a cylinder 204 having an outlet 205 connected by a hydraulic line 206 to wheel cylinders 207 of front and rear wheels 208 on the automobile. The cylinder 204 receives one end of a rearwardly directed plunger 209 which is clamped to the middle portion of a flexible diaphragm 210 by a clamping plate 211 and screws 212. The outer periphery of the diaphragm 210 is clamped between the flanges 198 and 201 by the clamping ring 199. Integral with the plunger 209 and at the forward end thereof, there is a smaller plunger 213 which slides within a sleeve 214 carried by the cylinder 197. The forward end of the sleeve 214 has an aperture 215 which is connected by means of a chamber 216 to the hydraulic inlet port 196. The aperture 215, furthermore, provides an opening through which a valve stop rod 217 can contact with an end 218 of the cylinder 197 so as to unseat a liquid compensation and cut-off valve 219 which is pressed against its seat 220 in a passageway 221 extending through the plungers 209 and 213. The valve 219 thus becomes unseated in the retracted position of the plungers 209 and 213 when the manual pressure is removed from the pedal 189. At other times the valve 219 is pressed against its seat by a spring 222. The sleeve 214 serves as a movable operating means for a projection 225 on a valve operating lever 226 which has a pivotal support 227 by means of ears 228 on the plunger 209 at one side of the plunger 213. At one end, the lever 226 has a spring support 229 from the plunger 209 and near its other end carries an adjustable screw-threaded stop 230. At this end of the lever 226 there is a pivotal connection 231 to a valve operating rod 232 connected to a vacuum inlet valve 233 cooperating with a valve seat 234 on a subsidiary diaphragm 235 which is connected to an air inlet valve sleeve 236 having an air inlet valve 237 for cooperating with an air valve seat 238. A spring 239 is provided for normally seating the air valve 237 on its seat 238. It will be understood that this vacuum and air valve construction is the same as shown in detail in Fig. 4 described hereinabove. The said spring 239 is located in an air chamber 240 which leads to a passageway 241 in the plunger 209 passing around the passageway 221 and which ends in a nipple 242 connected by a flexible conduit 243 to an air inlet port 244. This form of power unit, in Fig. 5, provides a reaction only from the modulating valve construction, and as the valve 219 is mounted on the plunger 209 no reaction is transmitted from the delivered high pressure liquid from the conduit 205 to the conduit 195 leading to the master cylinder.

The modification shown in Fig. 6 is constructed the same as the modification shown in Fig. 5, except that in this instance a piston 245 is shown fitting within a cylinder 246 and except for the arrangement of the valves. In this instance, I have provided on the cylinder 246 a smaller cylinder 247 having a plunger 248 within the same, which is provided with a cylindrical aperture 249 through which there extends a valve operating rod 251 with intermediate liquid transmitting passages 252. The rod 251 is carried by a valve 253 which is pressed against a valve seat 254 on the interior of the sleeve 248 by means of a spring 255 seated at its forward end against a plunger 256, having a longitudinal passageway 257. The plunger 256 slides within the sleeve 248 and is arranged to rest against the rear end of a valve operating lever 258 having a central aperture 259 to permit the plunger 256 to pass through the same. The upper end of the valve operating lever 258 has a pivot 260 connecting it to a valve operating rod 261 on a valve 262 which seats against a valve seat 263 within the piston 245 which is connected by a passageway 264 to the chamber within the cylinder 246 at the left of the piston 245. A spring 265, supported on a seat 266, normally presses the valve 262 to the right so as to open ports 267 leading from the chamber 263 to the right face of the piston 245. The said valve 262, thus, normally conveys the vacuum from the left to the right face of the piston 245. The lower end of the valve operating lever 258 has a pivot 268 connecting it to a valve operating rod 269 on an air inlet valve 270 which is normally pressed against a valve seat 271 by a spring 272 carried by a recess 273 in a chamber 274 in the piston 245. The said chamber 274 has a port 275 connecting it to the right face of the piston 245 and has a passage 276 leading to a nipple 277 connected by a rubber tube 278 to a vent, as shown in the modification shown in Fig. 5. This modification of my invention shown in Fig. 6, thus, receives on the manual means the hydraulic reaction from the hydraulic liquid applied by the power unit to the wheel cylinders, but on account of the manner in which the valves are mounted the manual means does not receive any substantial reaction from the modulating valve operating mechanism.

In the form of my invention shown in Fig. 7, I have provided a construction the same as that shown in Fig 5, except that in this instance I have utilized a piston 279 instead of the diaphragm 210 and except that I have arranged the modulating valves differently, a liquid compensation and cut-off valve 280 being provided, the same as that shown in Fig. 5. In this instance, in Fig. 7, there is shown an emergency brake operating lever 281 instead of the pedal 189 of Fig. 5. Also in this instance, instead of the modulating valve construction shown in Fig. 5, I have shown a vacuum admission valve 282 and a valve seat 283 therefor, which are the same as the vacuum admission valve 262, 263 of Fig. 6, and an air inlet valve 284 with a cooperating valve seat 285, which are the same as the valve 270, 271 of Fig. 6. Also, in this instance, I have provided a modulating valve operating lever 286 which is the same as the valve operating lever construction 258 in Fig. 6. In this form of my invention, owing to the mounting of the cut-off valve 280 on the piston 279 and the manner of mounting and seating the valves 282, 283 and 284, 285 on the piston 279, no reaction is received on the manual means from the hydraulic liquid applied to the wheel cylinders nor from the valve mechanism controlling the inlet and outlet of the vacuum for applying the pressure to the liquid delivered to the wheel cylinders. Therefore, in this construction the apparatus is substantially a non-reactive travel control mechanism for applying hydraulic pressures from a power unit in the operation of the brakes or other parts to be moved thereby.

In the operation of the form of my invention shown in Figs. 1, 2 and 3, assuming that the motor of the automobile is in operation and that a vacuum is accordingly supplied to the pipe 12, when manual pressure is applied to the pedal 8, this operates the piston 19 in the master cylinder 15 so as to apply hydraulic fluid under pressure through the pipe 21 to the inlet 22 on the power units. This will at first supply the pressure fluid around the valve, 48, 49 into the chamber 43 and thence through the ports 42 to the chamber 39 and from this chamber through the pipe 7 to the brake cylinders 5 so as to be applied to the brake cylinders 1, 2, 3 and 4 on the four wheels of the automobile. It will be understood that some braking force can be applied manually in this way, if desired, particularly of the power mechanism for any reason fails to operate, as for instance when a failure of vacuum should occur. As the manual pressure is increased, however, this results in closing the valve 48, 49 on the sleeve 40, thereby cutting off the communication of the liquid from the inlet 42 to the chamber 39 and moving the sleeve 40 and plunger 57 rearwardly so as to close the vacuum admission valve 69 and thereafter unseat the air inlet valve 86 which admits air through the air inlet 107 from around the edge of the cover 76. This will admit a controlled amount of air through the spider 28 to the chamber 91 within the cylinder 92. Inasmuch, as previously, the piston 106 has been submerged in a vacuum and as this admission of air admits controlled air pressure to the left face thereof, the plunger 96 will move to the right in the chamber 95 so as produce an intensified pressure in the latter, which is thence conveyed by the pipe 7 to the wheel brake cylinders. During this time it will be understood, also, that the amount of pressure applied through the pipe 7, whether manually or by means of power or both, to the brake cylinders 5 will be felt on the pedal 8 by the operator thereof by reason of the pipe connections 52, 54 operating in connection with the differential plungers 40 and 57, thus obtaining, also, a definite ratio of input to output force. In other words, the brakes can, thus, be controlled manually so as to apply the manual pressure or pressure derived from the power means in modulated amounts, according to the on or off modulation of the valves 69, 86, which are arranged to be self-lapping so that both of said valves are in closed position before any change in the direction of movement thereof, to admit more air through the air inlet 107 past the air inlet valve 86, or to apply more vacuum past the valve 60. It will be noted, furthermore, that in the apparatus the cut-off valve 48, 49 as well as the modulating valves 69, 86 are located at the same end of the structure, so that the construction is accordingly greatly simplified and the connections thereto can be more readily made when installing the unit on the chassis of the automobile.

In the modification of my invention shown in Fig. 4, the operation is somewhat similar and there is a further simplification in mounting the cut-off valve 143 and the modulating valves 157 and 161 altogether on one end of the power unit. In this instance, when manual pressure is applied to the pedal 119 the master cylinder 117 supplies the fluid under pressure through the pipe 121 to the inlet 122 where initially the liquid passes through the recesses 141 adjacent to the stop 146 which, in the initial retracted position of the plunger 144, retains the valve 143 open by reason of the web 142. The liquid, thus, under manual pressure, passes into the chamber 145 through the radial ports 151 and thence into the chamber 150 and by the pipe 153 to the cylinder 132 and thence through the pipe 133 to the brake cylinders 136 and 137, thus setting the brakes. Upon the increase of the manual pressure the plunger 144 is moved forwardly, thus closing the valve 143 and thereafter moving the vacuum outlet valve 157 into closed position followed by the opening of the air inlet valve 166 which admits air from the pipe 176 past the valve 166 into the pipe 172 and thence into the chamber 174 in the power cylinder 130. The piston 128, having been previously submerged in a vacuum, is now moved to the right by the air pressure in the chamber 174, thus moving the end of the said piston into the cylinder 132 and producing an intensified pressure which is supplied by the pipe 133 to the brake cylinders 136, 137. This application of the intensified pressure is, thus, controlled in modulating amounts by the operation of the valves 157 and 161, which are self-lapping so that they are both closed in changing from a position in which both valves are closed to a position where more air is admitted to apply greater braking force, or to a position where more vacuum is admitted to apply a lessened braking force. Throughout the application of manual force or intensified pressure from the cylinder 132, there will be a coordinate feel sensed by the operator on the pedal 110, according to the amount of braking force applied. Also, in this form of my invention there is provided a coordination of the travel of the pedal with the amount of travel of the brake operating elements by reason of the monitor chamber 127, for the reason that as the piston 128 moves towards the right a coordinate amount of fluid is drawn into the chamber 117 so that the operator of the pedal 110 not only has a feel but also senses the change of position which is coordinate to the amount of braking pressure and intensified pressure liquid supplied to the brakes. In this construction it will be noted that all the valves are conveniently located on one end closure for the power cylinder. Also, in this instance, the reaction is felt on the manual means from both the modulating valves and the hydraulic power pressure exerted on the brakes.

In the operation of the power unit shown in Fig. 5, and in which it will be noted that the liquid compensation and cut-off valve 219 is located at the inlet end from the power unit, when the manual pressure liquid delivered by the master cylinder 194 is received in the inlet 196, this liquid, under manual pressure, passes directly through the passageway 221 and the pipe 206 to the brake cylinders 207, owing to the fact that the valve 219, 220 is unseated by the stop rod 217 contacting with the end 218 of the cylinder 197. The wheel brakes will, thus, be given their initial movement in this manner, as for example to set the brakes and perhaps apply some of the braking pressure. When the manual pressure in the pipe 195 is increased, however, the plunger 209 will be moved forwardly, thus moving the stop rod 217 out of contact with the end 218 of the cylinder 197 and seating the valve 219, 220. This forward movement of the plunger 209 is brought about by the movement of the sleeve 214 forwardly by the manual pressure, thus moving the valve lever 226 to seat the vacuum valve 233, 234 followed by the unseating of the air inlet valve 237, 238 which admits air from the air port 244 to the right face of the diaphragm 210, resulting in the movement of the plunger 209 towards the left. In any position of rest of the foot thus attained on the pedal 189 the air valve 237, 238 will become seated in lapped position with regard to the valve 233, 234. Further forward movement, due to increased manual pressure, will again unseat the air valve 237, 238 to apply further movement of the plunger 209 towards the left so as to exert a higher braking effort on the braking cylinders 207. In the release of the pressure from the brakes the air valve 237, 238 will close and the vacuum admission valve 233, 234 will open, thus restoring the vacuum to both sides of the diaphragm 210. During this operation of applying hydraulic liquid under power pressure to the wheel cylinders 207 the reaction on the manual means will be due only to the amount of air pressure exerted on the right face of the diaphragm 210 by the operation of the modulating valve means and owing to the modulating valve being mounted on the diaphragm 235.

In the operation of the form of my invention shown in Fig. 6, the operation is the same essentially as Fig. 5 with the exception that a different reaction is obtained on the manual means owing to the difference of arrangement and operation of the valves. In this instance it will be noted that the liquid compensation and cut-off valve 253, 254 is mounted on the valve operating sleeve 248 and that the sleeve 248 operates a simple type of valve mounting which does not receive a reaction from the air pressures admitted, to any substantial extent. Accordingly, the reaction of the manual means in this instance is the reaction from the hydraulic pressure liquid applied by the power from the power unit on the brake cylinders.

In the modification of my invention shown in Fig. 7, the operation is a further modification of the operation of the apparatus shown in Fig. 5 inasmuch as in this instance the reactive modulating valves are not present and, the liquid compensation and cut-off valve 280 being mounted on the piston 279, there is substantially no reaction either from the valves or from the power hydraulic pressure liquid applied to the wheel cylinders, so that as a consequence travel control without a reaction is attained in applying the power from the manual controlling means 281 by means of the power piston 279 to the wheel brake cylinders.

While I have described my invention above in detail I wish it to be understood that many changes may be made therein without departing from the spirit of the same.

I claim:

1. A power unit comprising a movable wall, a chamber in which it moves, a connection on the power unit adapted to be connected to a source of pressure differing from the atmosphere, a venting connection, a valve means, having a plunger connected to the valve means and a chamber for the plunger, for controlling the application of the pressure from said source and from the venting connection to the movable wall, a second plunger connected to one side of the movable wall and having a plunger chamber, a hydraulic outlet for pressure liquid connected to said plunger chamber, a hydraulic inlet for pressure liquid connected to said first mentioned plunger for control of the valve means and a third plunger connected thereto, said hydraulic inlet and third plunger being located on the other side of the movable wall, and a liquid compensating valve on said other side of the movable wall, connected for operation with and movement by the third plunger to seat the compensating valve and said liquid compensating valve being located in a passageway connecting the hydraulic inlet to the hydraulic outlet, having a liquid compensating valve seat carried by the third plunger, said first mentioned valve means being constructed and arranged to exert a reaction from the air, admitted by the venting means, on said hydraulic inlet.

2. A power unit comprising a movable wall, a chamber in which it moves, a connection on the power unit adapted to be connected to a source of pressure differing from the atmosphere, a venting connection, a valve means mounted on the movable wall, having a plunger connected to the valve means and a chamber for said plunger, for controlling the application of pressures from said source and from the venting connection to the movable wall, a second plunger connected to one side of the movable wall and having a plunger chamber, a hydraulic outlet for pressure liquid connected to said plunger chamber, a hydraulic inlet for pressure liquid connected to said first mentioned plunger for control of the valve means and a third plunger connected thereto, said hydraulic inlet and third plunger being located on the other side of the movable wall, and a liquid compensating valve on said other side of the movable wall, connected for operation with and movement by the third plunger to seat the compensating valve and said liquid compensating valve being located in a passageway connecting the hydraulic inlet to the hydraulic outlet, having a liquid compensating valve seat carried by the third plunger, said first mentioned valve means being constructed and arranged to exert a reaction from the air, admitted by the venting means, on said hydraulic inlet.

3. A power unit comprising a movable wall, a chamber in which it moves, a connnection on the power unit adapted to be connected to a source of pressure differing from the atmosphere, a venting connection, a valve means, having a plunger connected to the valve means and a chamber for the plunger, for controlling the application of the pressures from said source and from the venting connection to the movable wall, a second plunger connected to one side of the movable wall and having a plunger chamber, a hydraulic outlet for pressure liquid connected to said plunger chamber, a hydraulic inlet for pressure liquid connected to said first mentioned plunger for control of the valve means and a third plunger connected thereto, said hydraulic inlet and third plunger being located on the other side of the movable wall, the third plunger having an operative connection to said valve means, and a liquid compensating valve on said other side of the movable wall, connected for operation with and movement by the third plunger to seat the compensating valve and said liquid compensating valve being located in a passageway connecting the hydraulic inlet to the hydraulic outlet, having a liquid compensating valve seat carried by the third plunger, said first mentioned valve means being constructed and arranged to exert a reaction from the air, admitted by the venting means, on said hydraulic inlet.

4. A power unit comprising a movable wall, a chamber in which it moves, a connection on the power unit adapted to be connected to a source of pressure differing from the atmosphere, a venting connection, a valve means, having a plunger connected to the valve means and a chamber for the plunger, for controlling the application of the pressures from said source and from the venting connection to the movable wall, a second plunger connected to one side of the movable wall and having a plunger chamber, a hydraulic outlet for pressure liquid connected to said plunger chamber, a hydraulic inlet for pressure liquid connected to said first mentioned plunger for control of the valve means and a third plunger connected thereto, said hydraulic inlet and third plunger being located on the other side of the movable wall, and a liquid compensating valve on said other side of the movable wall, connected for operation with the movement of the third plunger to seat the compensating valve and said liquid compensating valve being located in a passageway connecting the hydraulic inlet to the hydraulic outlet, having a liquid compensating valve seat located in a passage within the third plunger, said first mentioned valve means being constructed and arranged to exert a reaction from the air, admitted by the venting means, on said hydraulic inlet.

5. A power unit comprising a movable wall, a chamber in which it moves, a connection adapted to be connected to a source of pressure differing from the atmosphere, a venting connection, a valve means, a plunger and a chamber for the plunger, said plunger being connected to said valve means for controlling the application of the pressures from said source and from the amount of the air admitted from the venting connection to the movable wall, a second plunger connected to one side of the movable wall and having a plunger chamber, a hydraulic outlet for pressure liquid connected to said plunger chamber, a hydraulic inlet for pressure liquid connected to said first mentioned plunger for control of the valve means, and a third plunger located in a chamber connected to said inlet, said hydraulic inlet and last mentioned plunger being located on the other side of the movable wall, and a liquid compensating valve on said other side of the movable wall, connected to the third plunger chamber, and located in a passageway connecting the hydraulic inlet to the hydraulic outlet, having a valve seat located in a passage within the third plunger, said valve means being constructed and arranged to exert a reaction from the differential pressure due to the amount of the air, admitted by the venting means, on the liquid in said hydraulic inlet, the said valve means having a lever connected to said first mentioned plunger and provided with valve operating portions on the opposite sides of a pivotal connection from said lever to the movable wall.

6. A power unit comprising a movable wall, a chamber in which it moves, a connection adapted to be connected to a source of pressure differing from the atmosphere, a venting connection, a valve means, a plunger and a chamber for the plunger, said plunger being connected to said valve means for controlling the application of the pressures from said source and from the amount of the air admitted from the venting connection to the movable wall, a second plunger connected to one side of the movable wall and having a plunger chamber, a hydraulic outlet for pressure liquid connected to said plunger chamber, a hydraulic inlet for pressure liquid connected to said first mentioned plunger for control of the valve means, and a third plunger located in a chamber connected to said inlet, said hydraulic inlet and last mentioned plunger being located on the other side of the movable wall, and a liquid compensating valve on said other side of the movable wall, connected to the third plunger chamber and located in a passageway connecting the hydraulic inlet to the hydraulic outlet, having a valve seat located in said passageway within the third plunger, said valve means being constructed and arranged to exert a reaction from the differential pressure due to the amount of the air, admitted by the venting means, on the liquid in said hydraulic inlet, the said valve means having a lever connected to said first mentioned plunger and provided with valve operating portions on the opposite sides of a pivotal connection from said lever to the movable wall, and a spring located on the third plunger for seating the compensating valve.

7. A power unit comprising a movable wall in the form of a diaphragm, a connection adapted to be connected to a source of pressure differing from the atmosphere, a venting connection, a valve means, a plunger and a chamber for the plunger, said plunger being connected to said valve means mounted on a subsidiary diaphragm on the first mentioned diaphragm for controlling the application of the pressures from said source and from the amount of the air admitted from the venting connection to the movable wall, a second plunger connected to one side of the movable wall and having a plunger chamber, a hydraulic outlet for pressure liquid connected to said plunger chamber, a hydraulic inlet for pressure liquid connected to said first mentioned plunger for control of the valve means, and a third plunger connected to said inlet, said hydraulic inlet and last mentioned plunger being located on the other side of the movable wall, and a liquid compensating valve on said other side of the movable wall, connected to the third plunger and located in a passageway connecting the hydraulic inlet to the hydraulic outlet, having a valve seat associated with the third plunger, said valve means being constructed and arranged to exert a reaction from the differential pressure due to the amount of the air, admitted by the venting means, on the liquid in said hydraulic inlet.

8. A power unit comprising a movable wall, a chamber in which it moves, a connection on the power unit adapted to be connected to a source of pressure differing from the atmosphere, a venting connection, a valve means, having a plunger connected to the valve means and a chamber for the plunger, for controlling the application of the pressures from said source and from the venting connection to the movable wall, a second plunger connected to one side of the movable wall and having a plunger chamber, a hydraulic outlet for pressure liquid connected to said plunger chamber, a hydraulic inlet for pressure liquid connected to said first mentioned plunger for control of the valve means and a third plunger connected thereto, said hydraulic inlet and third plunger being located on the other side of the movable wall, and a liquid compensating valve on the said other side of the movable wall, connected for operation with the movement by the third plunger to seat the compensating valve and said liquid compensating valve being located in a passageway leading from the other side of the movable wall, connecting the hydraulic inlet to the hydraulic outlet, having a liquid compensating valve seat carried by the third plunger, said first mentioned valve means being constructed and arranged to exert a reaction from the air, admitted by the venting means, on said hydraulic inlet.

9. A power unit comprising a movable wall, a chamber in which it moves, a connection adapted to be connected to a source of pressure differing from the atmosphere, a venting connection, a valve means, a plunger and a chamber for the plunger, said plunger being connected to said valve means for controlling the application of the pressures from said source and from the venting connection to the movable wall, a second plunger connected to one side of the movable wall and having a plunger chamber, a hydraulic outlet for pressure liquid connected to said plunger chamber, a hydraulic inlet for pressure liquid connected to said first mentioned plunger for control of the valve means, and a third plunger connected to said movable wall, said hydraulic inlet and last mentioned plunger being located on the other side of the movable wall, and a liquid compensating valve on said other side of the movable wall, connected for operation with and movement by the third plunger to seat the compensating valve and located in a passageway leading through both said second and third plungers connecting the hydraulic inlet to the hydraulic outlet, having a valve seat associated with the third plunger, said valve means being constructed and arranged to exert a reaction from the air, admitted by the venting means, on said hydraulic inlet.

EDWARD A. ROCKWELL.

References Cited in the file of this patent

UNITED STATES PATENTS

| Number | Name | Date |
| --- | --- | --- |
| 2,260,491 | Stelzer | Oct. 28, 1941 |
| 2,275,697 | Stelzer | Mar. 10, 1942 |
| 2,300,136 | Rockwell | Oct. 27, 1942 |
| 2,353,755 | Price | July 18, 1944 |
| 2,359,687 | Stelzer | Oct. 3, 1944 |
| 2,374,545 | Ingres | Apr. 24, 1945 |
| 2,377,699 | Klimkiewicz | June 5, 1945 |
| 2,398,252 | Rockwell | Apr. 9, 1946 |
| 2,433,953 | Ingres | Jan. 6, 1948 |

OTHER REFERENCES

Commercial Car Journal, issue of Sept., 1943, page 64.